Nov. 21, 1933.   D. S. BARROWS   1,936,343
RAILWAY TRUCK
Filed Jan. 25, 1932   2 Sheets-Sheet 1

INVENTOR
Donald S. Barrows
BY
Ernest F. Mechlin
ATTORNEY

Nov. 21, 1933.  D. S. BARROWS  1,936,343
RAILWAY TRUCK
Filed Jan. 25, 1932   2 Sheets-Sheet 2
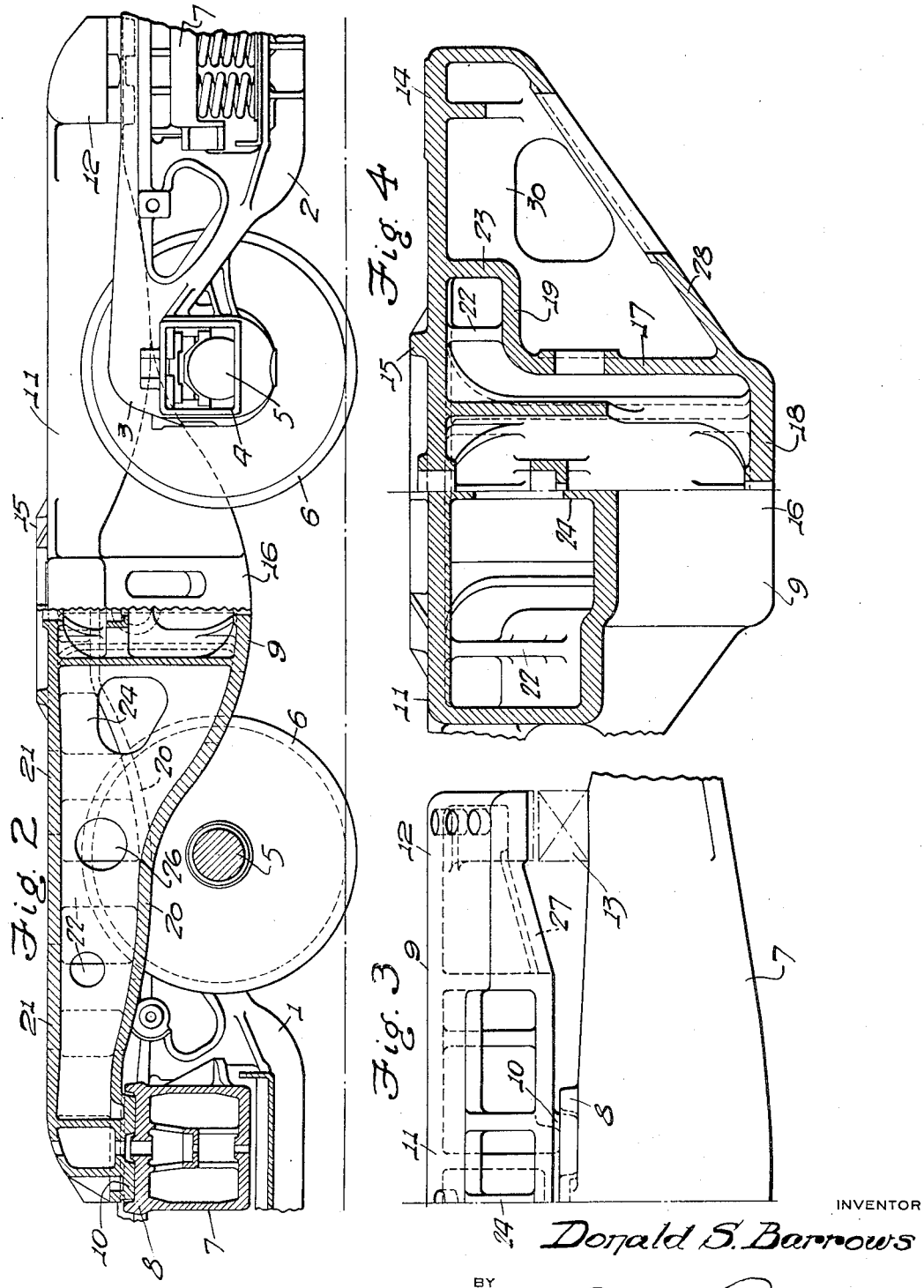
INVENTOR
Donald S. Barrows
BY
Ernest H. Mechlin
ATTORNEY Patented Nov. 21, 1933

1,936,343

UNITED STATES PATENT OFFICE 1,936,343

RAILWAY TRUCK

Donald S. Barrows, Rochester, N. Y., assignor to The Gould Coupler Company, New York, N. Y., a corporation of Maryland Application January 25, 1932. Serial No. 588,705

7 Claims. (Cl. 105—183)

This invention relates to railway vehicles and, more particularly, to trucks having more than six wheels.

The principal object of my invention, generally considered, is the provision of a railway truck involving more than six wheels, and comprising two trucks of more than two wheels each, each truck comprising a transverse bolster connected to the bolster of the other truck by a longitudinal bolster of a construction particularly adapted to allow for the intermediate axles, while securing approximately maximum strength for a given amount of metal.

Another object of my invention is the provision of an eight-wheel truck with a bolster spanning the distance between the center plates of two four-wheel trucks, the ends of said bolster being rectangular and gradually changing to T-shape toward the center.

A further object of my invention is the provision of a bolster for connecting two trucks having four or more wheels each, and preferably being integral, but comprising, for purposes of design only, a central simple span extending between the intermediate axles, in combination with two simple side spans, each extending from the center of the bolster to a transverse truck bolster, with the central span transferring its downward load to intermediate portions of each of the side spans, and resisting, at its center, the downward reactions from the adjacent ends of said side spans.

Other objects and advantages of the invention relating to the particular arrangement and construction of the various parts will become apparent as the description proceeds.

Referring to the drawings illustrating a preferred embodiment of my invention:—

Figure 2 is a partial side elevational and partial longitudinal sectional view of the truck shown in Figure 1.

Figure 3 is a fragmentary end elevational view of the longitudinal bolster and one of the associated transverse bolsters shown in Figures 1 and 2.

Figure 4 is a fragmentary transverse sectional view on the line 4—4 of Figure 1, looking in the direction of the arrows.

Figure 1:
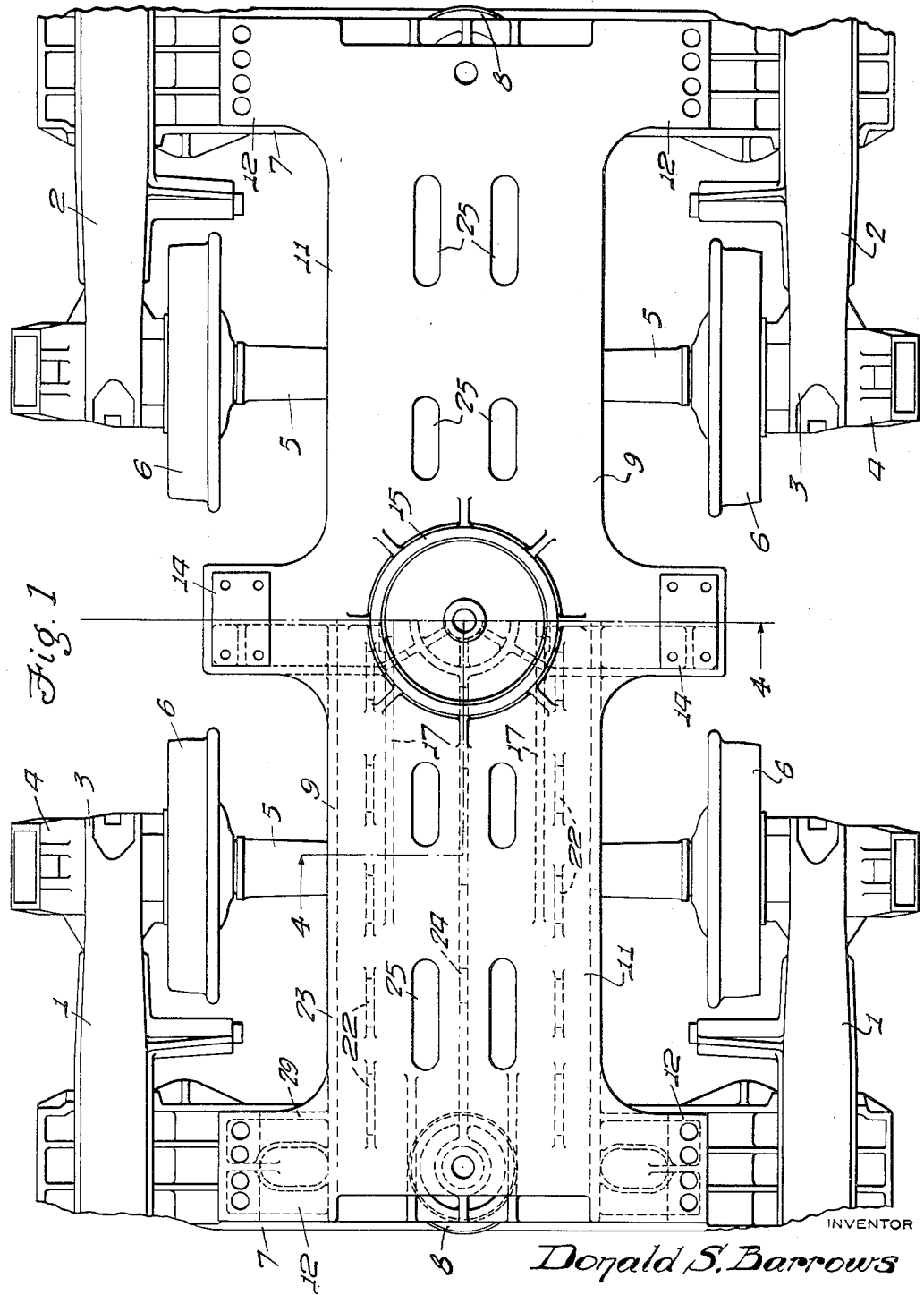
Figure 1 is a fragmentary plan of a truck comprising two four-wheel trucks connected by a bolster embodying my invention.

Referring to the drawings in detail, like parts being designated by like reference characters, there are shown fragmentary portions of an eight-wheel truck or articulated double four-wheel truck 1. Said truck comprises two four-wheel trucks 2, each comprising a pair of side frames 3 having journal boxes 4 receiving the end portions of axles 5 carrying wheels 6. Supported between the side frames 3 of each truck is a transverse bolster 7 having an upper or central center plate portion 8.

For connecting the four-wheel trucks 2, while allowing articulation therebetween, I employ the longitudinal or span bolster 9, the ends 10 of which rest on the center plate portions 8 of the transverse bolsters 7 in swivelling engagement therewith. The span bolster 9 comprises a main or body portion 11 of substantially uniform width having lateral end extensions 12 overlying the transverse bolsters 7 and adapted to cooperate with side bearings, or the like, 13 thereon. The span bolster 9 also comprises intermediate or central lateral extensions 14 providing portions adapted to cooperate with the car body (not shown) for stabilizing purposes, as will be understood. The bolster 9 also carries the center bearing portion 15 adapted to engage the body center plate (not shown).

Inasmuch as the span bolster 9 is, from the standpoint of design, a simple beam carrying a single concentrated load at the center or center plate portion 15, the magnitude of the bending moments at any cross-section follow a straight line from maximum at the center to zero at the ends. For uniform fiber stress, the magnitude of the section moduli should follow such a line. Assuming a rectangular cross-section of uniform width, the depth at the various sections should follow a parabola.

The intermediate or inner axles 5 of the trucks 2 prevent a convex bottom contour for a bolster of requisite strength immediately adjacent said axles. The concave lower outline of the bolster 9 above the axles 5 provides places where there would naturally be the greatest localization of stress and chance of possible failure if the bolster 9 were made rectangular in section and of uniform width for its full length, and of sufficient depth over the axles for requisite strength. The depth at the center would not be sufficient to economically utilize the metal or, in other words, we would have a beam which was not sufficiently deep in proportion to its width for economical design for bending purposes. The bolster is, therefore, designed to be substantially rectangular in section from its end portions 10 to points over the axles 5, from which points it is reinforced by the downwardly extending convex projection 16 of less width than the body 11 of said bolster, as shown most clearly in Figure 4, whereby the section gradually changes from rectangular at the ends to T-shape at the center, and the lower outline changes from convex downwardly along a parabola to adjacent the axles 5 where it is concave downwardly over the axles and approximately concentric therewith, from where it again changes to convex downwardly and continues to the center of the span.

Another way to consider the integral or cast bolster 9 previously described is as if it were formed of three pieces for purposes of design only. One of these pieces can be considered as comprising a central simple span extending from axle to axle. The other pieces involve two simple spans, each extending from the center of the bolster 9 or center plate to a transverse truck bolster 7. The central span, of course, has to transfer its downward load to intermediate portions of each of the side spans and resist at its center the downward reactions from the inner ends of said side spans.

This design is clear from a consideration of Figure 2 when it is seen that the construction can be analyzed into a central simple beam with a convex outline extending between the axles 5, the width of said beam being defined by the side webs 17, the depth by the bottom web 18, and the outstanding webs 19 defining the lower portions of the horizontal part of the T-section, shown most clearly in Figure 4. The side spans may be considered of uniform width and convex lower outline, as indicated at 20. The bolster generally comprises an upper web 21, lower web portions 18 and 19, and vertical connecting web portions 22, not to mention the side web portions 17 and 23, and the central web portion 24.

The upper web and central web portions are desirably apertured, as indicated at 25 and 26, for lightening the construction and facilitating core removal. The side or cantilever extensions 12 and 14 may be formed by continuation with the upper web 21, inclined bottom web portions 27 and 28, and transverse vertical web portions 29 and 30.

From the foregoing disclosure, it will be seen that I have devised a bolster adapted to connect trucks, each having more than two wheels, to form an articulated truck of more than six wheels, said bolster being designed to economically use the metal therein, while at the same time allowing for the underlying axles, the section, therefore, preferably gradually changing from rectangular adjacent the ends beyond the axles to T-shape toward the center intermediate the axles.

Although a preferred embodiment of my invention has been disclosed, it will be understood that modifications may be made within the spirit and scope of the appended claims, and that the terms employed are used for descriptive and not limiting purposes.

I claim:—

1. In combination, a pair of railway trucks each comprising a plurality of axles with wheels thereon and a transverse bolster, a longitudinal bolster with a body of substantially uniform width spanning the distance between said transverse bolsters and adapted to support the body of an associated railway vehicle, the lower outline of said longitudinal bolster above the axles being concave downwardly and formed with a convex extension between said axles, said extension being of less width than the bolster body.

2. In combination, a pair of railway trucks each comprising a plurality of axles with wheels thereon and a transverse bolster, a longitudinal bolster with a body substantially rectangular in section beyond the intermediate axles, said section gradually becoming T-shaped toward the center intermediate said axles.

3. In combination, a pair of railway trucks each comprising a plurality of axles with wheels thereon, and a transverse bolster, a longitudinal bolster spanning the distance between said transverse bolsters, said longitudinal bolster being integral but including what are, in effect, two simple side spans each extending from the center to a transverse bolster, and a central span extending between the intermediate axles and acting on intermediate portions of said side spans and resisting at its center the downward reactions from the inner ends of each of said side spans.

4. A bolster adapted to span the distance between transverse bolsters of associated trucks for supporting a portion of a railway vehicle body, said bolster having a body of substantially uniform width and a lower outline concave at points intermediate the center and ends, said outline changing to convex adjacent the center, said convex portion being of less width than the bolster body.

5. A longitudinal truck bolster formed with end bearing portions adapted to fit center plate portions of associated transverse truck bolsters and a body of substantially uniform width and reinforced adjacent its center by a convex extension of less width than said body.

6. A longitudinal truck bolster with end portions substantially rectangular in section and formed with lower faces adapted to fit upper central portions of associated transverse truck bolsters, said end portions gradually changing until the bolster becomes T-shaped in section adjacent its center.

7. A longitudinal bolster adapted to span the distance between transverse bolsters of a pair of associated trucks and comprising, in effect, two simple side spans each extending from the center to an end, and a central span extending between portions corresponding with the positions of the intermediate axles of said trucks and acting on intermediate portions of said side spans and resisting at its center the downward reactions from the inner ends of said side spans, all of said spans being formed as an integral structure.

DONALD S. BARROWS.